US005445867A

United States Patent [19]

Ogawa et al.

[11] Patent Number: 5,445,867

[45] Date of Patent: Aug. 29, 1995

[54] THERMAL TRANSFER RECORDING SHEETS AND BACK COATING COMPOSITIONS THEREFOR

[75] Inventors: Masahiko Ogawa, Takasaki; Shinji Irifune, Annaka, both of Japan

[73] Assignee: Shin-Etsu Chemical Co., Ltd., Tokyo, Japan

[21] Appl. No.: 236,854

[22] Filed: May 2, 1994

Related U.S. Application Data

[63] Continuation-in-part of Ser. No. 968,128, Oct. 29, 1992, abandoned.

[30] Foreign Application Priority Data

Oct. 30, 1991 [JP] Japan ........ 3-311995

[51] Int. Cl.$^6$ ........ B32B 3/00

[52] U.S. Cl. ........ 428/195; 428/206; 428/405; 428/407; 428/446; 428/448; 428/451; 428/452; 428/480; 428/913; 428/914; 503/227

[58] Field of Search ........ 428/195, 913, 914, 446, 428/447, 206, 405, 407, 448, 451, 452, 480; 503/227

[56] References Cited

U.S. PATENT DOCUMENTS 3,878,263 4/1975 Martin .
4,306,050 12/1981 Koerner et al. ........ 528/26
4,575,545 3/1986 Klemarczyk ........ 526/242
4,575,546 3/1986 Nakos et al. ........ 526/245
4,665,147 5/1987 Lien et al. ........ 528/15
4,678,846 7/1987 Weitemeyer et al. ........ 525/477
4,908,274 3/1990 Jachmann ........ 428/252
5,093,306 3/1992 Mukoyoshi et al. ........ 503/227
5,158,924 10/1992 Konagaya et al. ........ 503/201
5,236,768 8/1993 Fujii et al. ........ 428/195

FOREIGN PATENT DOCUMENTS 2304093 12/1990 Japan .

OTHER PUBLICATIONS

Andou, 04-329194, Nov. 17, 1992 Abs Grp. No. M1391 vol. 17, No. 168 Patent Abstracts of Japan.

*Primary Examiner*—Patrick J. Ryan
*Assistant Examiner*—William A. Krynski
*Attorney, Agent, or Firm*—Millen, White, Zelano & Branigan

[57] ABSTRACT

In a thermal transfer recording sheet having a silicone layer on that surface of a plastic base film which is remote from a colorant layer, the silicone layer is formed by curing a radiation-curable silicone composition with electron beams or UV rays radiation. The composition is predominantly comprised of a (meth)acryloxy group-containing organopolysiloxane. The sheet is improved in heat resistance and lubricity and thus capable of forming clear images.

15 Claims, No Drawings

THERMAL TRANSFER RECORDING SHEETS AND BACK COATING COMPOSITIONS THEREFOR

CROSS REFERENCE TO RELATED APPLICATION

This application is a continuation-in-part of application Ser. No. 07/9613,128 filed on Oct. 29, 1992, now abandoned the entire contents of which are hereby incorporated by reference.

FIELD OF THE INVENTION

This invention relates to thermal transfer recording sheets for use with video printers, facsimile machines, computer printers and other printers of the type using thermal heads for heating the sheets to record images thereon.

BACKGROUND OF THE INVENTION

In unison with the rapid advance of current information technology, a variety of information processing systems have been developed and a variety of recording systems have been employed therein. Among these recording systems, the thermal recording system has been in wide-spread use because of its advantages of light weight, low noise during printing, and ease of maintenance.

The thermal recording systems include two types, a thermal melt transfer type using thermal transfer recording sheets in which a colorant layer is comprised of a thermally melting material and a pigment and a sublimation type using thermal transfer recording sheets in which a colorant layer is comprised of a sublimatable dye. The thermal melt transfer type is characterized by color development with low energy. In contrast, the sublimation type requires high energy, but is adapted to produce full color images since it is easy to reproduce middle tone by utilizing differential energy applied.

In either type of thermal recording system, an increased quantity of heat is applied from the thermal head to a thermal transfer recording sheet for color development. Especially in the sublimation type, substantial heat is applied to substrates such as polyester films which are softened leading to a sticking phenomenon and heat distortion. This often can cause image distortion especially where high density is required, resulting in a failure to produce quality images.

The recent trend is toward the use of thin substrates for the purposes of increasing printing speed and reducing transfer energy. This, in turn, requires improvements in the heat resistance, slippage and the like of thermal transfer recording sheets.

One effective approach for such improvements is to coat thermal transfer recording sheets with silicone compositions. In order for silicone compositions be cured under sufficient conditions to comply with the requirements of thermal transfer recording sheets, some modifications are necessary. To this end, the same assignee as the present invention previously proposed a coating composition predominantly comprising a siloxane/styrene/(meth)acrylate copolymer (Japanese Patent Application Kokai No. 210160/1988).

However, prior art silicone compositions require heat for curing. Where an extremely thin film of up to 10 μm, for example, is used as the thermal transfer recording sheet substrate, the film can be distorted during heat curing of silicone coatings. In addition, the cured coatings are less satisfactory in solvent resistance and the like. There exists a need for a thermal transfer recording sheet of quality capable of forming clear images while eliminating the above-mentioned problems.

SUMMARY OF THE INVENTION

We have found that when a silicone layer is formed on the back surface of a plastic film by curing a radiation-curable silicone composition, there is obtained a thermal transfer recording sheet which is improved in heat resistance, slippage and other properties and capable of producing clear images.

According to the present invention, there is provided a thermal transfer recording sheet comprising a plastic base film with a pair of major surfaces. A colorant layer is on one major surface of the film. A silicone layer comprised of a radiation-curable silicone composition in cured state is on the other major surface of the film.

In the present invention, the radiation-curable silicone composition is predominantly comprised of a (meth)acryloxy group-containing organopolysiloxane of the following general formula (1):

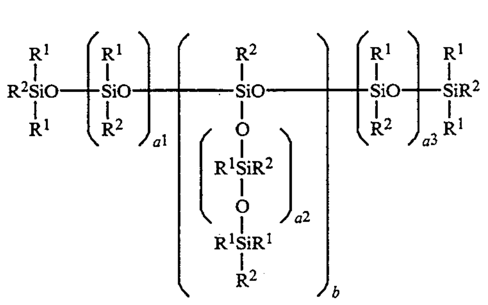

(1)

wherein $R^1$ is a hydrogen atom, a lower alkyl group having 1 to 4 carbon atoms, or a phenyl group;

$R^2$ is as defined for $R^1$ or a group of the general formula (2):

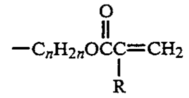

(2)

wherein

R is a hydrogen atom or methyl group and n is a number of from 1 to 3, letters $a^1$, $a^2$ and $a^3$ are 0 or positive numbers and $a^1+a^2+a^3$ is in the range of 10 to 200, and letter b is 0 or a positive number of 1 to 3, 3 to 30 mol % of the total of $R^1$ and $R^2$ groups attached to silicon atoms in a molecule being the group of formula (2).

In general, many curable silicone compositions are known for their improved heat resistance, mold release and other properties. Most curable silicone compositions which are used with sheets of paper and film for purposes of imparting heat resistance, mold release, lubricity and other properties thereto are of the condensation reaction or addition reaction curing type. They must be cured by heating at 80° C. or higher temperatures for several tens of seconds in order to provide satisfactory coatings. In addition, since these silicone compositions are often poor in adhesion and especially difficult to bond to plastic films, it is necessary to apply primers to the plastic films.

The problems of such silicone compositions for use as thermal transfer recording sheet back coating compositions can be eliminated if the silicone compositions can be cured with radiation, especially electron radiation. Especially, a radiation-curable acryl-modified silicone composition predominantly comprised of a (meth)acryloxy group-containing organopolysiloxane of formula (1) defined above can be quickly cured under moderate conditions or at room temperature without losing the inherent properties of silicone. In addition, this composition can establish a close contact with a substrate such as plastic film and thus form a cured coating having improved lubricity and minimal migration on the substrate without causing shrinkage thereof. Therefore, a silicone layer can be formed on the surface of a substrate such as plastic film through a low-temperature, brief curing process without a need for primer application. This process causes no damage to the substrate even when it is extremely thin. By using this silicone composition as a back coating composition, there is obtained a thermal transfer recording sheet which has improved properties including heat resistance and lubricity so that it can travel smoothly without causing a sticking phenomenon even when printing is commenced with high energy, ensuring formation of clear images.

DETAILED DESCRIPTION OF THE INVENTION

According to the present invention, the thermal transfer recording sheet includes a plastic base film having a pair of opposed major surfaces. A colorant layer is on one major surface and a silicone layer is on the other major surface or back surface of the film. The silicone layer is comprised of a radiation-curable silicone composition in cured state.

The plastic film used as the substrate may be selected from those plastic films which are conventionally used in the art, for example, films of polyethylene, polypropylene, polycarbonate, polyesters, acrylic resins, and polyamides. Polyethylene terephthalate (PET) films are most preferred. The thickness of plastic film may be properly selected in accordance with a particular application generally in a range of 3 to 8 μm. The present invention allows the use of extremely thin plastic films of less than 10 μm in thickness.

The colorant layer may be formed using thermal melt dyes and sublimatable dyes. Examples of the sublimatable dyes include styryl, naphthol, thiadiazole, monoazoanthraquinone, naphthoquinone, anthraisothiazole, quinophthalone, and pyridone dyes and examples of the thermal melt dye include anthraquinone and azo dyes. The colorant layer may be formed by applying the colorant to the substrate by means of a gravure coater, roll coater or the like, usually to a thickness of about 0.5 to 5 μm.

On the back surface of the plastic film remote from the colorant layer is formed a silicone layer which is a cured coating of a radiation-curable silicone composition.

The back coating composition is a radiation-curable silicone composition which contains as a major component an acryloxy or methacryloxy group-containing organopolysiloxane of formula (1):

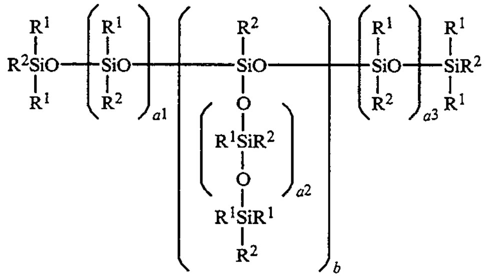

(1)

wherein $R^1$ is a hydrogen atom, a lower alkyl group having 1 to 4 carbon atoms, or a phenyl group;

$R^2$ is as defined for $R^1$ or a group of the general formula (2):

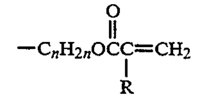

(2)

wherein

R is a hydrogen atom or methyl group and n is a number of from 1 to 3, letters $a^1$, $a^2$, and $a^3$ are 0 or positive numbers and $a^1+a^2+a^3$ is in the range of 10 to 200, and letter b is 0 or a positive number of 1 to 3, 3 to 30 mol % of the total of $R^1$ and $R^2$ groups attached to silicon atoms in a molecule being the group of formula (2).

More particularly, $R^1$ in formula (1) is a hydrogen atom, methyl group, ethyl group, phenyl group or the like. $R^2$ is the same atom or group as $R^1$ or a (meth)acryloxy group of formula (2). In the compound of formula (1), 3 to 30 mol %, preferably 5 to 20% of the total organic groups ($R^1$ and $R^2$) attached to silicon atoms in a molecule must be the (meth)acryloxy group of formula (2). Less than 3 mol % of (meth)acryloxy group is too small to promote curing whereas more than 30 mol % detracts from lubricity.

Preferably, the letters $a^1+a^2+a^3$ is in the range of 40 to 200.

The following structures are examples of the (meth) acryloxy group-containing organopolysiloxane of formula (1).

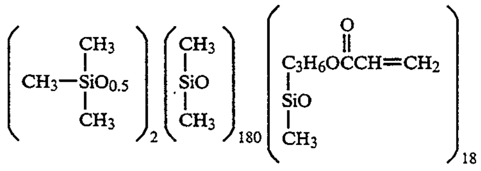

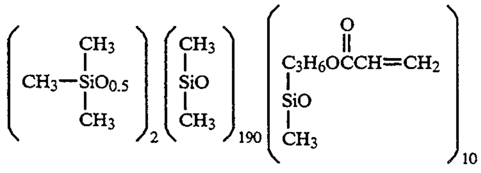

-continued

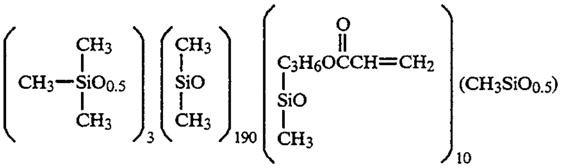

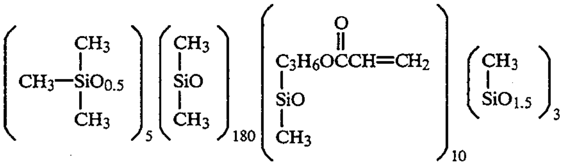

The organopolysiloxane of formula (1) may be synthesized simply by heat polymerizing a mixture of siloxane oligomers in the presence of an acid catalyst such as methanesulfonic acid and trifluoromethanesulfonic acid.

The silicone composition may consist essentially of the organopolysiloxane of formula(1), although various additives may be optionally added to the silicone composition of the present invention insofar as the objects of the invention are achieved. Exemplary additives include photo-reaction initiators such as acetophenone, benzophenone, 4-chlorobenzophenone, 4,4-dimethoxybenzophenone, 4-methylacetophenone, benzoin methyl ether, and benzoin trialkylsilyl ethers; restrainers against curing inhibition by oxygen such as diethylamine, 2-diethylamineethanol and piperidine; reactive diluents such as hexanediol diacrylate and trimethylpropane triacrylate; organic solvents; leveling agents; fillers; antistatic agents; defoamer; and pigments.

If the photo-reaction initiator is required to be added, it may be blended in an amount of 3 to 10% by weight.

In the manufacture of the thermal transfer recording sheet according to the invention, the above-formulated silicone composition as a back coating composition is applied to the back surface of a plastic base film having a colorant layer previously applied on the front surface by coating with a bar coater, gravure coater, reverse coater or the like or by spraying, to a thickness of about 0.1 to 5 μm, and then cured by radiation of actinic rays.

Various kinds of actinic rays can be used for the purpose of curing the inventive composition including electron beams from an electron accelerator, X-rays from an X-ray apparatus, α-, β-and γ-rays from a radioisotope, ultraviolet light from mercury arc lamps, medium-and high-pressure mercury lamps and the like, and so on. The doses of radiation should be sufficient to allow the coating to cure therewith and varies with a particular type of radiation. The preferred dose is about 2 to 5 Mrad for electron beams radiation. In the case of ultraviolet rays radiation, the coating is exposed for about 0.1 to 10 seconds to a 2-kW high-pressure mercury lamp (80 W/cm) at a spacing of 8 cm, for example.

There have been described thermal transfer recording sheets which have improved properties including heat resistance and lubricity and ensure formation of clear images since they can run smoothly without causing a sticking phenomenon even when the substrate is an extremely thin plastic film and printing is commenced with high energy. The thermal transfer recording sheets are useful with video printers, facsimile machines, and personal computer printers. These sheets are obtained using the back coating composition according to the present invention.

EXAMPLES

Examples of the present invention are given below by way of illustration and not by way of limitation. All parts are by weight. Viscosity and index of refraction are as measured as 25° C.

Synthesis Example 1

A 1-liter four-necked flask equipped with a stirrer, thermometer, and Dimroth condenser was charged with 9 parts of hexamethyldisiloxane of formula (3), 760 parts of octamethylcyclotetrasiloxane of formula (4), and 176 parts of a cyclotetrasiloxane of formula (5) all shown below. The contents were mixed and then a compound of formula (6) shown below was added in an amount of 20 ppm based on the siloxanes combined. The mixture was agitated for 5 minutes at room temperature.

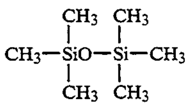

(3)

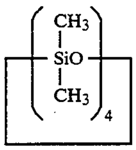

(4)

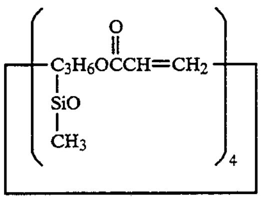

(5)

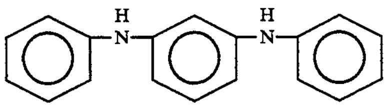

(6)

To the siloxane mixture was added 2.0 parts of a sulfonic acid $CF_3SO_3H$. With stirring in an air stream, the mixture was heated to a temperature of 80° to 85° C. over 2 hours and equilibration reaction was continued for 6 hours at the temperature. At the end of reaction, the reaction mixture was cooled down to room temperature. $N(C_2H_5)_3$ was added to the mixture in an amount of 3 mol per mol of $CF_3SO_3H$, and agitation was continued for 5 hours. The reaction mixture was neutralized, treated with activated carbon, filtered, and then stripped at 110° C. and 4 mmHg, obtaining a pale yellow clear liquid in a yield of 90%. Analysis by infrared (IR) absorption spectroscopy and nuclear magnetic resonance (NMR) spectroscopy revealed that the product was an organopolysiloxane of the following formula (7), which is designated Acrylsiloxane I. It has a viscosity of 820 centipoise and an index of refraction of 1.416.

(7)

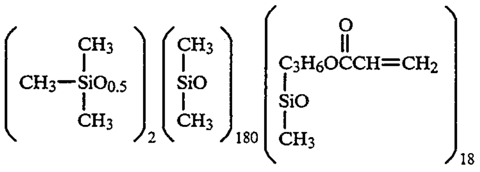

Synthesis Example 2

An organopolysiloxane was synthesized by the same procedure as in Synthesis Example 1 except that the flask was charged with 10 parts of hexamethyldisiloxane of formula (3), 872 parts of octamethylcyclotetrasiloxane of formula (4), and 85 parts of cyclotetrasiloxane of formula (5). There was obtained a red clear liquid in a yield of 90%. IR and NMR analysis revealed that the product was an organopolysiloxane of the following formula (8), which is designated Acrylsiloxane II. It has a viscosity of 400 centipoise and an index of refraction of 1.428.

(8)

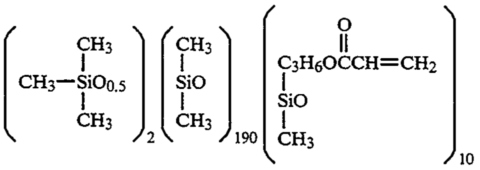

Synthesis Example 3

An organopolysiloxane was synthesized by the same procedure as in Synthesis Example 1 except that the flask was charged with 19 parts of a siloxane of the following formula (9), 872 parts of octamethylcyclotetrasiloxane of formula (4), and 85 parts of cyclotetrasiloxane of formula (5). There was obtained a red clear liquid in a yield of 90%. IR and NMR analysis revealed that the product was an organopolysiloxane of the following formula (10), which is designated Acrylsiloxane III. It has a viscosity of 400 centipoise and an index of refraction of 1.428.

(9)

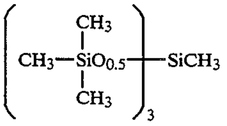

(10)

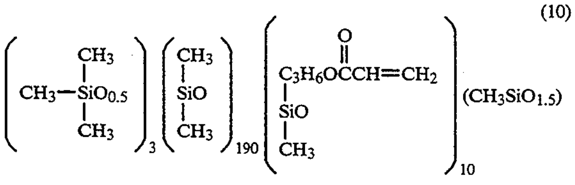

Examples 1-3

A polyamide ink containing 33 parts of an anthraquinone series cyan disperse dye was coated on one surface of a polyester film of 4.5 μm thick to a thickness of 0.8 μm. On the opposite surface of the film, each of the organopolysiloxanes obtained in Synthesis Examples 1 to 3 (Acrylsiloxanes I to III) was coated to a thickness of 0.3 μm and then exposed to electron radiation for curing. In this way, three thermal recording sheets are obtained. During and after the process, cure, adhesion, lubricity, migration and substrate thrinkage were examined as follows. The results were shown in Table 1.

Cure and adhesion

Cure was evaluated in connection with the steps of coating and curing the organopolysiloxane composition to a polyester film of 4.5 μm thick. In the case of electron beams radiation curing, cure was represented by the dose of electron radiation (Mrad) required to form a fully cured coating. In the case of ultraviolet rays radiation curing, evaluation was made in terms of the exposure time (seconds) required to form a fully cured coating upon exposure to two 2-kW high-pressure mercury lamps (80 W/cm) at a distance of 8 cm. The coating was regarded fully cured when the coating was not stripped off or clouded by rubbing the surface with fingers.

Lubricity

Lubricity was evaluated by coating a predetermined amount of the organopolysiloxane composition to a polyester film of 4.5 μm thick, exposing the coating to radiation for curing, placing a glass plate having a weight of 200 grams on the cured coating, and pulling the glass plate at a rate of 0.3 m/min. in a direction parallel to the coating surface. The force (grams) required to pull the glass plate was recorded. The force was divided by the glass plate weight to give a coefficient of dynamic friction (in accordance with ASTM D1894-63).

Migration

Silicone migration was evaluated by coating a predetermined amount of the organopolysiloxane composition to a polyester film of 4.5 μm thick, exposing the coating to radiation for curing, placing another polyester film of 25 μm thick on the coating, keeping the assembly under pressure for one day, and applying an oily marker ink to the 25-μm thick film for examining how the film was repellent against the ink in accordance with the following criterion.

○: not repellent
Δ: somewhat repellent
X: repellent

Substrate shrinkage

The substrate was visually observed to see whether it shrank or wrinkled.

Example 4

After applying a colorant layer on a polyester film of 4.5 μm thick as in Example 1, the film on the back surface was formed with an organopolysiloxane coating of Acrylsiloxane I containing 5% by weight of benzoin isobutyl ether to a thickness of 1.2 μm. The coating was cured by exposure to a high-pressure mercury lamp. Also cure, adhesion, lubricity, migration and substrate shrinkage were examined. The results were shown in Table 1.

Comparative Example 1

After applying a colorant layer on a polyester film of 4.5 μm thick as in Example 1, the film on the back surface was formed with a silicone coating of a heat curable silicone KNS-305 (Shin-Etsu Chemical Co., Ltd.) and 2% by weight of curing catalyst PL-8 (Shin-Etsu Chemical Co., Ltd.) to a thickness of 0.3 μm. The coating was cured by heating for 30 seconds in a hot air circulation dryer at 120° C. Also cure, adhesion, lubricity, migration and substrate shrinkage were examined. The results were shown in Table 1.

TABLE 1

| | Cure | Adhesion | Lubricity* | Migration | Shrinkage |
|---|---|---|---|---|---|
| Example 1 | 3 Mrad | Good | 2.3 | ∘ | No |
| Example 2 | 4 Mrad | Good | 1.7 | ∘ | No |
| Example 3 | 4 Mrad | Good | 1.3 | ∘ | No |
| Example 4 | 0.6 sec. | Good | 2.0 | ∘ | No |
| Comparative Example 1 | — | Poor | — | ∘ | Yes |

*4.5 — μm polyester film had a coefficient of dynamic friction of 4.3

As is evident from Table 1, the heat curable silicone composition (Comparative Example 1) did not adhere well to the substrate which contracted upon the curing. By comparison the radiation curable silicone compositions (Examples 1–4) had the advantages that the base films did not contract upon curing and the coatings firmly adhered to the base films and were improved in lubricity. All these advantages suggest smooth run without sticking and hence, satisfactory image printing.

While the preferred embodiment of our invention has been fully described in order to explain its principles, it is understood that various modifications or alterations may be made without departing from the scope of the invention as set forth in the appended claims.

We claim:

1. A thermal transfer recording sheet comprising:

a plastic base film having two major surfaces, a colorant layer on one major surface of said film, and a silicone layer on the other major surface of said film comprised of a radiation-curable silicone composition in cured state, wherein said radiation-curable silicone composition is predominantly comprised of an acryloxy or methacryloxy group-containing organopolysiloxane of the following formula (1):

(1)

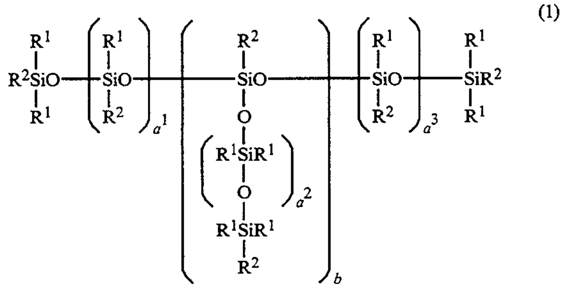

wherein $R^1$ is a hydrogen atom, a lower alkyl group having 1 to 4 carbon atoms, or a phenyl group;

$R^2$ is as defined for $R^1$ or a group of the formula (2):

(2)

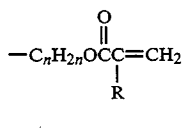

wherein

R is a hydrogen atom or methyl group and n is a number of from 1 to 3;

letters $a^1$, $a^2$ and $a^3$ are 0 or positive numbers and $a^1+a^2+a^3$ is in the range of 10 to 200;

letter b is 0 or a positive number of 1 to 3; and 3 to 30 mol % of the total of $R^1$ and $R^2$ groups attached to silicon atoms in a molecule being an $R^2$ group of formula (2).

2. The thermal transfer recording sheet of claim 1, wherein, in the organopolysiloxane, 5 to 20 mol % of the total of $R^1$ and $R^2$ groups attached to silicon atoms in a molecule are an $R^2$ group of the formula (2).

3. The thermal transfer recording sheet of claim 1, wherein, in the organopolysiloxane, the letters $a^1+a^2+a^3$ is from 40 to 200.

4. The thermal transfer recording sheet of claim 1, wherein said plastic base film is a polyethylene terephthalate film having a thickness of from 3 to 8 μm.

5. The thermal transfer recording sheet of claim 1, wherein the colorant layer comprises a thermal melt dye or sublimatable dye.

6. The thermal transfer recording sheet of claim 1, wherein the silicone layer has a thickness of about 0.1 to 5.0 μm.

7. The thermal transfer recording sheet of claim 1, wherein the radiation-curable silicone composition is cured by exposure to electron beams, X-rays, α-rays, β-rays, γ-rays or ultraviolet light.

8. The thermal transfer recording sheet of claim 1, wherein the radiation-curable silicone composition is cured by exposure to electron beams at a dose of 2 to 5 Mrad.

9. The thermal transfer recording sheet of claim 1, wherein the radiation-curable silicone composition is cured by exposure to ultraviolet rays from a 2-kW high-pressure mercury lamp at a spacing of 8 cm for 0.1 to 10 seconds.

10. The thermal transfer recording sheet of claim 1, wherein the plastic base film is a film of polyethylene, polypropylene, polycarbonate, polyester, acrylic resin or polyamide.

11. The thermal transfer recording sheet of claim 1, wherein the plastic base film has a thickness of 10 μm or less.

12. The thermal transfer recording sheet of claim 5, wherein the dye is a styryl, naphthol, thiadiazole, monoazoanthraquinone, naphthoquinone, anthraisothiazole, quinophthalone, pyridone, anthraquinone or azo dye.

13. The thermal transfer recording sheet of claim 1, wherein the colorant layer has a thickness of 0.5 to 5.0 μm.

14. The thermal transfer recording sheet of claim 1, wherein the acryloxy or methacryloxy group containing organopolysiloxane is

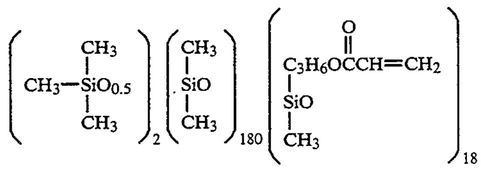

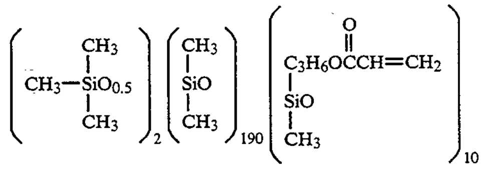

-continued
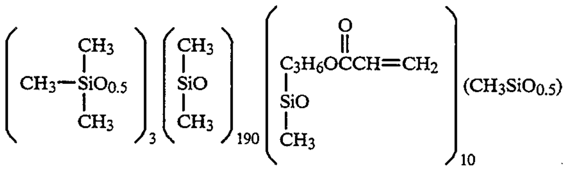
-continued
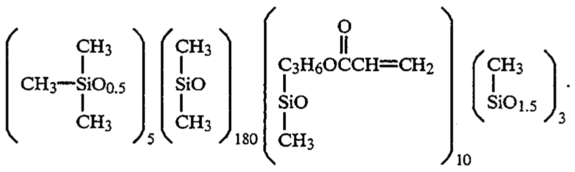
15. The thermal transfer recording sheet of claim 1, wherein the radiation-curable silicone composition further comprises at least one of a photo-reaction initiator, a restrainer against curing inhibition by oxygen, a reactive diluent, an organic solvent, a leveling agent, a filler, an antistatic agent, a defoamer or a pigment.
* * * * *